United States Patent Office 3,278,191
Patented Oct. 11, 1966

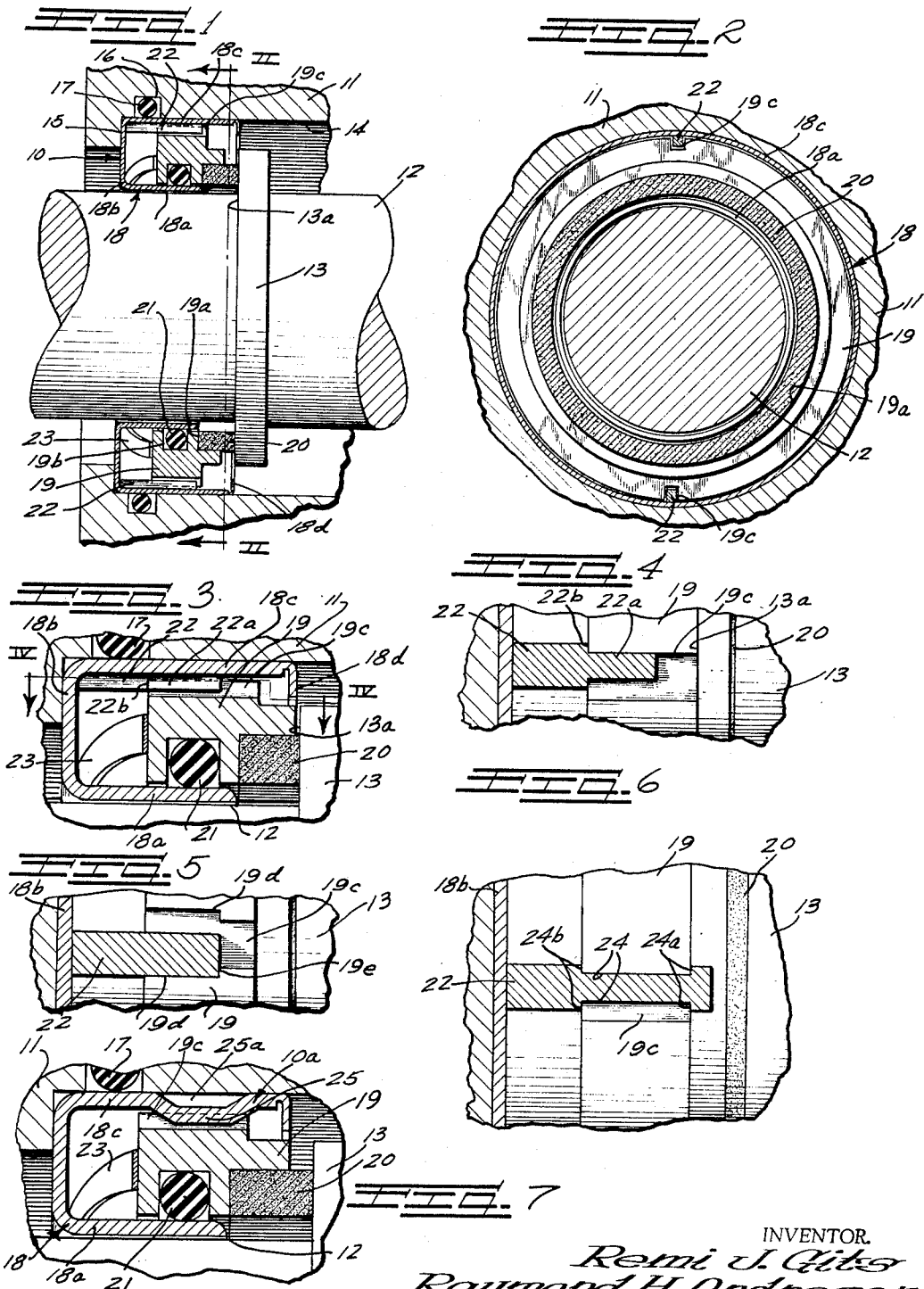

3,278,191
SHAFT SEAL
Remi J. Gits, Hinsdale, and Raymond H. Andresen, Barrington, Ill., assignors to Gits Bros. Mfg. Co., Chicago, Ill., a corporation of Delaware
Filed Aug. 19, 1963, Ser. No. 303,002
3 Claims. (Cl. 277—40)

This invention relates to face-type shaft seals wherein a spring urged seal ring is held against rotation relative to a casing by a key and groove arrangement which cannot interfere with spring action on the seal ring even when high impact torque loads cause excessive wear of the engaging key and slot surfaces. Specifically this invention relates to a key and slot arrangement for shaft seals which eliminates seal ring "hang-up" problems even under excessive wear conditions caused by torque impact loads on the key and slot engaging surfaces.

It has been customary in face type shaft seals to emboss a key in the periphery of the seal casing for engaging a keyway or slot in the seal ring or seal ring carrier. The embossments form depressions or dimples in the casing wall opening up a leakage path between the casing and the housing or other part to be sealed and into which the casing was press fitted. Therefore to minimize the leakage path these embossed keys were limited in axial length and terminated within the axial length of the keyway. Repeated torque impact loads on the key and keyway frequently caused pocket formations in the slot or keyway which would prevent free axial shifting of the seal ring and impede the spring load on the ring causing the ring to "hang-up" in the casing and destroying the face sealing engagement with the follower ring on the shaft. Even though the key was made longer than the slot or keyway, the formation of grooves in the key by the keyway walls also formed shoulders preventing free axial shifting of the seal ring in the casing and causing the same to "hang-up" in the casing.

According to the present invention free axial shifting of the seal ring in the casing of a face-type seal assembly is insured by so positioning and regulating the length relationship of the key and keyway that the forward end of the key never projects beyond the forward end of the slot even under the minimum operating height of the assembly and always projects beyond the rear end of the slot or keyway. Under these conditions wear grooves formed in the slot or keyway will always have open rear ends free from shoulders that impede forward axial shifting of the seal ring in the casing. Conversely wear grooves formed in the key will always have open front ends unimpeded by shoulders which could obstruct the forward axial shifting of the seal ring in the casing. Thus the invention solves seal ring "hang-up" problems in facetype seals where the soft low impact strength graphitic carbon seal rings have the key slot directly therein engaged by the harder and higher impact strength key tending to wear pockets in the slot as well as in those assemblies where the seal ring is mounted in a harder metal carrier which has the keyway or slot that might form wear grooves in the key.

An important feature of this invention includes the provision of key forming lugs in the casing without depressing the casing wall to open up any leakage path. These lugs can take the form of hard metal ribs brazed, spot welded or otherwise bonded to the inner surface of the peripheral wall of the casing to extend axially from the back wall of the casing and terminate inwardly from the other end of the casing to insure projection of the front end of the seal ring slot beyond the front end of the lug.

It is then an object of this invention to provide a key and slot arrangement for shaft type seals which will not interfere with free axial shifting of the seal ring in its casing regardless of excessive wear on the key and slot walls.

Another object of the invention is to provide a key and keyway arrangement for face type seals which does not open up a leakage path in the seal casing and cannot impede free axial shifting of the seal ring in the casing.

Another object of this invention is to provide a facetype shaft seal having an annular metal casing of U-shape cross section with an outer cylindrical peripheral wall free from indentations and adapted to be press fitted into a part to be sealed, a spring loaded metal seal ring carrier in the casing and an interfitting key and keyway connection between the casing and retainer arranged so that the key will always project behind the keyway and the keyway will always project beyond the key, in all relative axial positions of the carrier and the casing to thereby eliminate possible formation of abutments on either the key or keyway which will cause the retainer to "hang-up" in the casing.

Another object of this invention is to provide keyed together axially shiftable parts including an elongated key on one of the parts and an elongated slot in the other of the parts engaging the key for an appreciable portion of its length but in all operating relative axial positions extending forwardly of the key at one end and terminating short of the key at the other end to eliminate formation of any abutment shoulders on either the key or slot walls which could interfere with free forward axial movement of one member relative to the other.

Other and further objects of this invention will be apparent to those skilled in this art from the following detailed description of the annexed sheet of drawings which, by way of preferred examples only, illustrate several embodiments of the invention.

On the drawings:

FIGURE 1 is a fragmentary vertical cross sectional view, with parts in elevation, of a face-type shaft seal of this invention mounted for operation at its minimum height and showing the seal nose or graphitic carbon seal ring in a new unworn condition.

FIGURE 2 is a transverse cross sectional view, with parts in end elevation, taken substantially along the line II—II of FIG. 1.

FIGURE 3 is a somewhat enlarged fragmentary view of a portion of the seal of FIG. 1 showing the condition and position of the parts near the end of the useful life of the seal when the seal nose is worn down almost flush to the carrier.

FIGURE 4 is a fragmentary cross sectional view, with parts in plan, taken along the line IV—IV of FIG. 3.

FIGURE 5 is a view similar to FIG. 4 but illustrating a worn key slot condition.

FIGURE 6 is a view similar to FIGS. 4 and 5 but illustrating a "hung-up" condition caused by wearing away of a key which projects beyond the key slot.

FIGURE 7 is an enlarged vertical cross sectional fragmentary view of a modified seal construction according to this invention.

As shown on the drawings:

In FIG. 1 a shaft seal assembly 10 of this invention is shown in an operating environment including a housing part 11, a shaft 12 and a seal follower ring or collar 13 on the shaft 12. The housing has a cylindrical bore 14 terminating in a radial shoulder 15 and an internal groove 16 is formed in the bore adjacent this shoulder 15. An O-ring seal 17 is seated in the groove 16.

The seal assembly 10 includes a stamped metal casing 18 of U-shaped cross section and having a cylindrical inner peripheral portion 18a, a radial back wall or bight portion 18b and a cylindrical outer peripheral portion 18c. The casing 18 can be formed of any suitable metal such as steel, including stainless steel. A metal seal ring carrier 19 is loosely mounted in the casing 18 between the inner peripheral wall 18a and the outer peripheral wall 18c for free sliding movement toward and away from the back wall 18b. This carrier 19 can be composed of metal such as steel, a hard plastic material such as nylon or the like, and has a recess 19a in the front face thereof receiving a graphitic carbon seal ring 20 in snug fixed relation. This seal ring 20 projects forwardly from the carrier ring or sleeve 19 to provide the nose of the seal assembly which sealingly engages the flat radial face 13a of the seal follower or collar 13. The carrier sleeve also has an internal groove 19b receiving an O-ring seal 21 which engages the inner peripheral wall 18a of the casing.

The outer periphery of the carrier sleeve or ring 19 has a pair of diametrically opposite axially extending open end slots 19c thereacross with each slot having flat side walls providing abutment surfaces for axially extending metal keys or lugs 22 which are brazed, spot welded, or otherwise bonded to the inner surface of the outer peripheral portion 18c of the casing 18. As shown in FIG. 2, the keys or lugs 22 fit freely in the slots or keyways 19c so that free axial movement of the seal ring carrier 19 is not impeded.

A wave spring 23, bottomed on the back wall 18b of the casing, urges the carrier sleeve 19 toward the open front end of the casing to hold the seal nose in good sealing engagement with the face 13a of the follower 13. To maintain the assembly in the casing, the front end of the outer peripheral wall of the casing 18c is turned inwardly to provide a flange 18d that will engage the carrier 19 to prevent its removal from the casing.

The exterior surface of the outer peripheral wall 18c of the casing 18 is free from any indentations and is sized for a press fit in the bore 14. The exterior O-ring seal 17 sealingly engages this outer surface of the casing to prevent leakage around the casing. Since the outer peripheral surface of the casing is free from any indentations or broken surfaces the seal ring 17 can be positioned as desired at any place along the axial height or length of the casing and much latitude for the positioning of the seal ring groove 16 is thereby provided. Further, if desired, several such grooves could be provided for receiving a multiplicity of seal rings.

The inner peripheral wall 18a of the casing 18 freely embraces the shaft 12 in spaced concentric relation therefrom so as not to interfere with free rotation of the shaft. The inner seal ring 21 rides on the outer peripheral surface of this inner peripheral wall 18a in sealing engagement to prevent leakage through the casing. Since this surface of the casing is likewise free from any indentations or broken surfaces the seal ring 21 can ride freely along the full height or length of the casing wall 18a without loss of sealing efficiency.

It will be especially noted that the keys or lugs 22 extend axially from the back wall 18b of the casing and terminate inwardly from the open end of the casing. The length of the lugs or keys 22 is predetermined so that their forward ends will always be inwardly of the open front ends of the slots or keyways 19c of the carrier sleeve 19 even when the seal assembly is at its minimum operating height as shown in FIG. 1. As there shown the face 13a of the follower ring or collar 13 is positioned substantially flush with the front end of the casing 18 and since the nose of the seal ring 20 rides against this face, the carrier 19 is depressed back into the casing. It will be noted that even in this depressed innermost position of the carrier 19 the front ends of the slots 19c are forwardly from the front ends of the lugs or keys 22. It will also be noted that the rear ends of the lugs 22 project beyond the rear ends of the slots 19c.

Since the rotating shaft carries the follower ring 13 therewith and since the front face or nose of the graphitic carbon ring 20 rides on and rubs against the rotating seal face 13a, a considerable torque load is placed on the seal ring 20 and its carrier sleeve 19 which is transmitted through the key slots to the keys or lugs 22 which of course are effective to hold the carrier sleeve 19 against rotation in the casing. Intermittent and reverse rotations of the shaft will of course cause the keyways to impact against the keys and these impact loads are distributed along the length of the key that is engaged by the slot wall. The invention maintains minimum impact unit loads by providing an appreciable area contact between the key and keyway. Thus as shown in FIG. 1, while the forward end of the key slot 19c projects beyond the key 22, an elongated area of the key is seated in the keyway.

As shown in FIG. 3, as the nose of the graphitic carbon ring 20 wears down in use, the spring 23 continually urges the carrier sleeve 19 forwardly and in the substantially "worn out" condition of the seal in FIG. 3 the front end of the sleeve 19 is closely approaching the sealing face 13a indicating a complete worn out condition. Even in this position, however, the key or lug 22 is engaged for a substantial portion of its length in the key slot 19c.

Repeated impacts of the keyway against the key will tend to wear either the key or the slot faces depending upon the relative hardness and wear strength of the lugs and carrier sleeve 19. As shown in FIGS. 3 and 4 the key or lug 22 has been worn on both faces under repeated reverse torque impact caused by reverse rotation of the shaft 19 tending to transmit torque loads in opposite directions to the carrier sleeve 19. A reduced width tongue portion 22a is thereby formed on the front end of the lug or key 22 but since this front end of the key is always within the key slot even at the minimum operating height of the new assembly shown in FIG. 1 and the relative positions of the parts in the worn out assembly shown in FIG. 3, the reduced width tongue will be free from any ribs or abutments that will interfere with free forward movement of the carrier sleeve 19. Thus any shoulders such as 22b formed by the wearing down of the portion of the rib or key that is disposed in the key slot 19c will be rearwardly of the follower ring 19 and cannot interfere with free forward movement of the retainer toward the follower under the influence of the spring 23.

In the event the carrier sleeve 19 is softer than the key or lug 22, grooves 19d might be formed in the key slot 19c as shown in FIG. 5. These slots 19d however will always be free from any obstructions that could interfere with forward movement of the sleeve 19 because any abutment shoulder such as 19e between the grooves and the slot walls 19c will always be forwardly of the front ends of the keys or lugs 22 and the grooves 19d will have free open rear ends. This is necessarily so because the lugs or keys 22 always project beyond the rear ends of the keyways 19c and the front ends of the keyways are always forwardly from the front ends of the lugs or keys.

It will of course be understood that while equal depth wear grooves have been shown on both sides of the key and slot, the wear will occur mostly on the surface opposing the direction of rotation and in installations which do not include reverse rotations the wear on the key or slot surface downstream from the actual rotation resisting abutment surface will be negligible.

FIG. 6 illustartes a "hung-up" condition of a shaft seal assembly wherein the key slot is allowed to reach a position where its front end is behind or rearwardly from the front end of the key. In the illustration the key 22 projects both forwardly and rearwardly from the key slot 19c of the carrier ring 19 and grooves 24 are formed on both opposite faces of the key under repeated impact loads of the keyway or slot. These grooves will have radial shoulders 24a at the front ends thereof because the key 22 projects beyond the key slot 19c. These shoulders will prevent forward movement of the carrier sleeve 19. Of course, similar shoulders 24b will be formed at the rear ends of the slots 24 but these shoulders do not impede forward movement of the sleeve 19.

In the modified seal 10a of FIG. 7 parts identical with parts described in FIGS. 1 to 5 have been marked with the same reference numerals. In the arrangement of FIG. 7 the brazed or welded on lugs 22 are replaced with embossed keys such as 25 formed on the outer wall 18c of the casing 18 and while the embossed key 25 provides a dimple 25a in the outer surface of the casing wall 18c thereby limiting the position for the O-ring seal 17 to an area behind the dimple, the key 25 nevertheless is engaged by the slot or keyway 19c for its entire length and the key slot always projects beyond the front end of the key so that shoulders such as 24a cannot be formed in the key to impede the forward movement of the carrier sleeve 19. If the sleeve 19 were softer than the key 25 this key would be extended beyond the rear end of the slot or keyway 19c. In the indicated arrangement the shorter key 25 is softer than the carrier ring 19 and will be worn by the key slot 19c as in the arrangement shown in FIGS. 3 and 4.

From the above description it will be understood that this invention provides torque key and slot arrangements in shaft seals which cannot impede free axial shifting of a spring loaded seal part even under excessive wear conditions.

We claim as our invention:

1. A shaft seal which comprises an annular metal casing of U-shaped cross section and having an outer peripheral wall, an inner peripheral wall in spaced concentric relation inwardly from the outer peripheral wall and a back wall connecting the inner and outer peripheral walls, said outer peripheral wall being free from indentations and adapted to be press fitted into a part to be sealed in complete mating contact with said part and adapted to receive the resilient seal ring therearound at any place along the length thereof in complete sealing contact therewith, an elongated metal rib on the inner surface of said outer peripheral wall and extending generally axially along substantially the entire length of said wall in fixed relation therewith, a metal carrier sleeve slidably mounted in said casing between the inner and outer peripheral walls thereof, a graphitic carbon seal ring carried by the forward end of said sleeve, a spring in the casing between the sleeve and back wall of the casing urging the seal ring forwardly from the casing for sealing engagement with a part to be sealed, said sleeve having an open ended slot in the outer periphery thereof across the length thereof receiving said rib to form a key and keyway assembly to hold the sleeve against rotation in the casing, said rib projecting rearwardly from the open end of said slot under all positions of the sleeve in the casing and said rib terminating inwardly from the front end of the slot under all positions of the sleeve in the casing whereby wear grooves formed in either the rib or key slot will be free of abutment shoulders interfering with forward shifting of the sleeve under the influence of the spring.

2. A key and slot construction for a shaft seal which comprises a metal seal casing having diametrically opposed axially extending inwardly projecting ribs terminating short of the front end of the casing and extending to the back end of the casing, a seal ring carrying sleeve slidably mounted in the casing having diametrically opposite key slots receiving said keys in slidable relation, said keys and key slots having mating engagement for an appreciable axial length portion of the casing, and said key slots projecting forwardly from the front ends of the keys under all operating heights of the seal assembly to prevent formation of shoulders which would impede free axial shifting of the sleeve toward the front of the casing.

3. In a shaft seal including a casing ring of U-shaped cross section having a back wall, an outer periphery adapted to be sealed in a bore and an inner periphery adapted to surround a shaft together with a spring loaded seal sleeve slidable in the casing between said inner and outer peripheries toward and away from said back wall, an axial key embossed in the outer periphery of said casing, and an open ended keyway in the periphery of said sleeve receiving said key therein and projecting beyond the key under all operating positions of the sleeve, said keyway being harder than said key to prevent groove formations in the keyway under repeated torque loads and impacts.

References Cited by the Examiner
UNITED STATES PATENTS

| | | | |
|---|---|---|---|
| 2,844,393 | 7/1958 | Jensen | 277—87 |
| 2,857,182 | 10/1958 | Bain et al. | 277—87 X |
| 3,013,823 | 12/1961 | Schulz | 277—40 |
| 3,193,298 | 7/1965 | Voitik et al. | 277—40 |

M. CARY NELSON, *Primary Examiner.*

HENRY T. KLINKSIEK, LAVERNE D. GEIGER,
*Examiners.*